(12) United States Patent
Simpson et al.

(10) Patent No.: US 10,575,051 B2
(45) Date of Patent: Feb. 25, 2020

(54) SYSTEM AND METHOD FOR ENHANCED TELEVISION AND DELIVERY OF ENHANCED TELEVISION CONTENT

(71) Applicant: Triveni Digital Inc., Princeton, NJ (US)

(72) Inventors: Mark Simpson, Princeton Junction, NJ (US); Richard Chernock, Lawrenceville, NJ (US)

(73) Assignee: TRIVENI DIGITAL INC., Princeton, NJ (US)

( * ) Notice: Subject to any disclaimer, the term of this patent is extended or adjusted under 35 U.S.C. 154(b) by 0 days.

(21) Appl. No.: 14/746,256

(22) Filed: Jun. 22, 2015

(65) Prior Publication Data

US 2015/0289012 A1 Oct. 8, 2015

Related U.S. Application Data

(63) Continuation-in-part of application No. 12/617,832, filed on Nov. 13, 2009, now Pat. No. 9,066,154.

(51) Int. Cl.
*H04N 21/235* (2011.01)
*H04N 21/426* (2011.01)
(Continued)

(52) U.S. Cl.
CPC ..... *H04N 21/44008* (2013.01); *H04N 21/235* (2013.01); *H04N 21/23892* (2013.01);
(Continued)

(58) Field of Classification Search
CPC .. H04N 21/43; H04N 21/4307; H04N 21/432; H04N 21/438; H04N 21/44008
(Continued)

(56) References Cited

U.S. PATENT DOCUMENTS

| 5,774,664 A * | 6/1998 | Hidary | H04L 29/06 |
| | | | 348/E7.024 |
| 8,995,526 B2 * | 3/2015 | Karczewicz | H04N 19/105 |
| | | | 375/240.15 |

(Continued)

*Primary Examiner* — Dominic D Saltarelli
(74) *Attorney, Agent, or Firm* — Howard IP Law Group

(57) ABSTRACT

Provided is an enhanced television system and method including a television display in communication with a broadcast enhancement pathway via a first communication interface of the television display and with a video connection via a second communication interface of the television display. The television display receives and displays uncompressed video data from a digital video stream carried over the video connection from a video source and enhancement data from the broadcast enhancement pathway. The digital video stream includes embedded base programming identification metadata. The television display receives the enhancement data from the broadcast enhancement pathway without the enhancement data passing through the video source; and extracts a base identification tag from the embedded base programming identification metadata. The enhancement data received from the broadcast enhancement pathway associated with the base identification tag is combined with the digital video stream. The enhancement data includes instructions for receiving additional enhancement information.

21 Claims, 6 Drawing Sheets

(51) Int. Cl.
*H04N 21/43* (2011.01)
*H04N 21/462* (2011.01)
*H04N 21/61* (2011.01)
*H04N 21/63* (2011.01)
*H04N 21/65* (2011.01)
*H04N 21/44* (2011.01)
*H04N 21/435* (2011.01)
*H04N 21/654* (2011.01)
*H04N 21/6543* (2011.01)
*H04N 21/6332* (2011.01)
*H04N 21/2389* (2011.01)
*H04N 21/84* (2011.01)
*H04N 21/8358* (2011.01)
*H04N 21/439* (2011.01)
*G10L 19/018* (2013.01)

(52) U.S. Cl.
CPC ....... *H04N 21/4263* (2013.01); *H04N 21/435* (2013.01); *H04N 21/4307* (2013.01); *H04N 21/4622* (2013.01); *H04N 21/6112* (2013.01); *H04N 21/6125* (2013.01); *H04N 21/6332* (2013.01); *H04N 21/654* (2013.01); *H04N 21/6543* (2013.01); *H04N 21/84* (2013.01); *G10L 19/018* (2013.01); *H04N 21/4394* (2013.01); *H04N 21/6131* (2013.01); *H04N 21/8358* (2013.01)

(58) Field of Classification Search
USPC .................................. 725/109–112, 121, 136
See application file for complete search history.

(56) References Cited

U.S. PATENT DOCUMENTS

| | | | | |
|---|---|---|---|---|
| 2002/0104099 | A1* | 8/2002 | Novak | H04N 7/17318 |
| | | | | 725/136 |
| 2002/0145622 | A1* | 10/2002 | Kauffman | G06F 17/3028 |
| | | | | 715/723 |
| 2008/0098433 | A1* | 4/2008 | Hardacker | H04N 7/163 |
| | | | | 725/52 |
| 2009/0323729 | A1* | 12/2009 | Simon | H04H 20/67 |
| | | | | 370/509 |
| 2011/0019870 | A1* | 1/2011 | Ballocca | H04N 7/162 |
| | | | | 382/100 |
| 2011/0078753 | A1* | 3/2011 | Christianson | H04N 21/8166 |
| | | | | 725/109 |

* cited by examiner

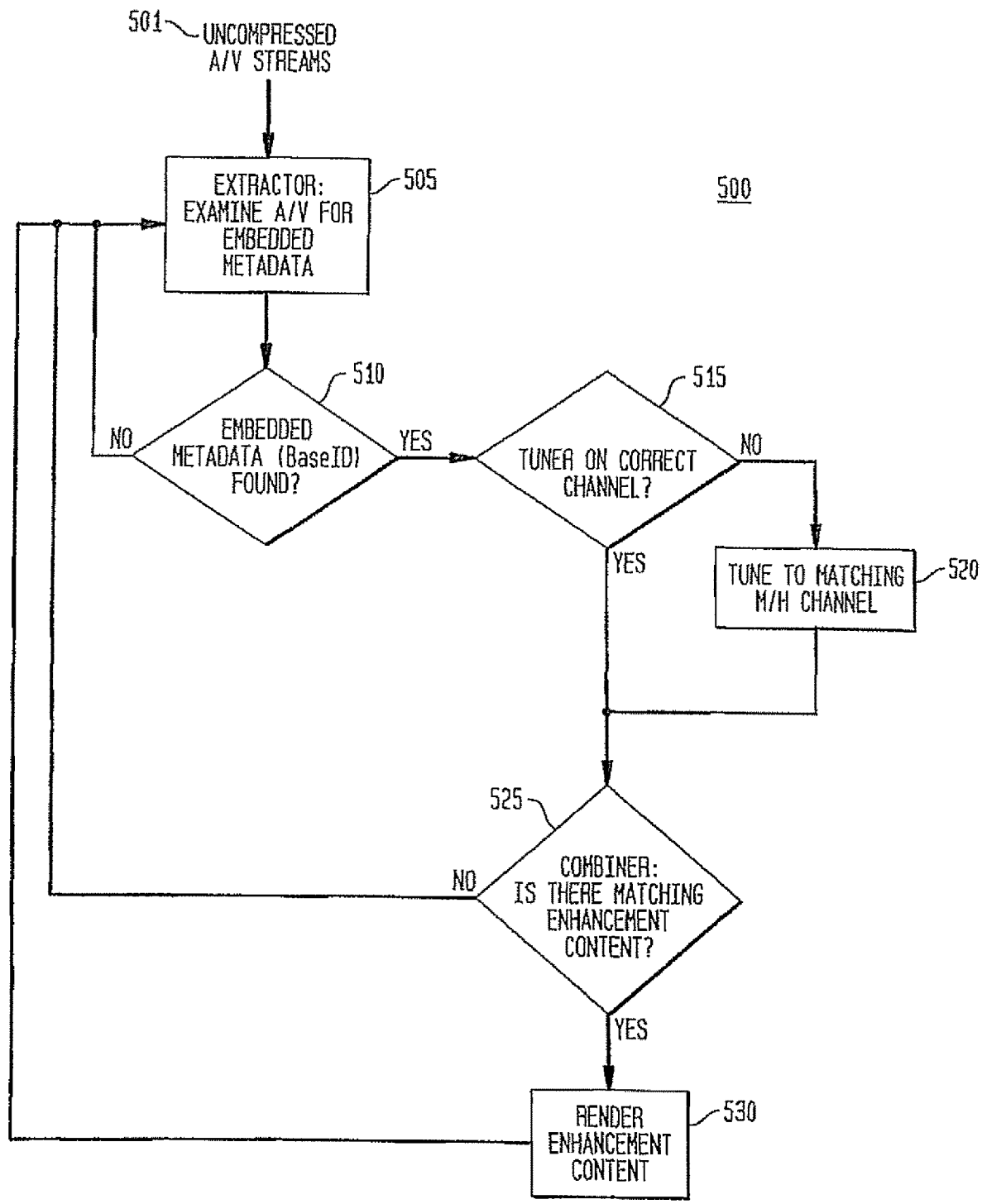

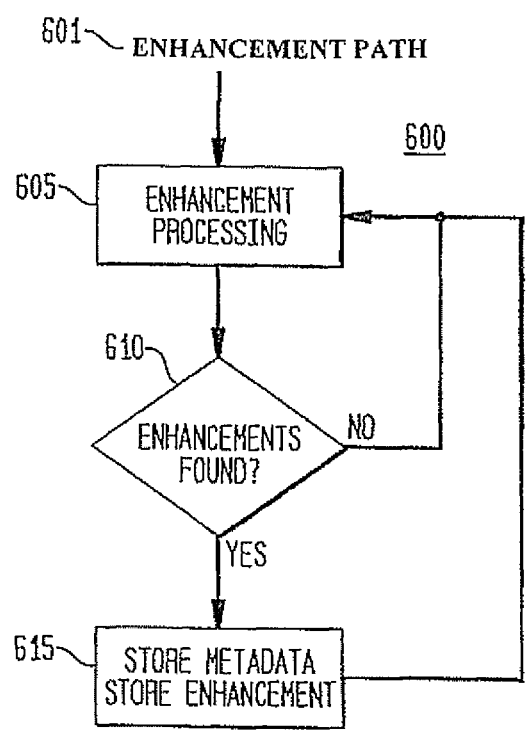

SYSTEM AND METHOD FOR ENHANCED TELEVISION AND DELIVERY OF ENHANCED TELEVISION CONTENT

CROSS REFERENCE TO RELATED APPLICATIONS

This application is a continuation-in-part of, and claims priority from co-pending U.S. patent application Ser. No. 12/617,832, filed by Mark Simpson, et al. on Nov. 13, 2009, entitled "System and Method for Enhanced Television and Delivery of Enhanced Television Content," which is incorporated herein by reference in its entirety.

FIELD OF THE INVENTION

This invention generally relates to media, and more particularly, to a method and system for broadcasters and networks to deliver enhanced television components to televisions directly, without the need for technical cooperation from intervening distributors.

BACKGROUND OF THE INVENTION

Over the past several years, the television industry has seen a great amount of activity focused on enhancing the basic television-viewing platform. While declining in overall use due to the emergence of alternatives for home leisure time, such as the Internet on home PCs and video gaming, home television systems still represent a large share of the entertainment/advertising market. Because of this status, an enhanced form of television has been sought by the television industry for at least the last 15 years.

Enhanced television involves components beyond standard audio/video programming delivered in a linear fashion. These components include but are not limited to pushed data files, interactive components and data streams. While such "Enhanced TV" components might typically be delivered as part of the television service, even in this case they are present as discrete elements in the multiplex (i.e., digital transport stream). Additionally, functionality is required at the receiver to extract these components, reassemble them and act accordingly.

One problem that the US TV broadcast industry faces is that only approximately 15% of television viewers receive their signals directly from the broadcast antennas. The remaining viewers receive their signals from another provider, such as cable, satellite and/or Telco (IPTV), i.e., a Multichannel Video Programming Distributor (MVPD). Depending upon business arrangements, these distribution systems more often than not strip off components other than the linear television. Thus, for the approximately 85% non-antenna viewers, any enhanced components provided by the TV broadcaster would not be available. Additionally, for most of these viewers, a Set-Top Box (STB) is used for the reception/decoding of DTV signals, and the TV is used only as a viewing device. The STBs deployed by the MVPD will support any enhanced functions enabled by the MVPD themselves—generally not those from the broadcaster. In short, the various MPVDs have established a strong controlling position versus the local broadcasters for deployment of advanced forms of television content and associated revenues.

In a typical viewer arrangement, MVPD-deployed STBs tune/demux/decode the DTV signals and connect to the television using one of a number of means, such as via HDMI (High-Definition Multimedia Interface) or other connector. This connection typically carries only decoded video/audio. In order to enable the reception and use of enhanced broadcast content by an increased number of TV viewers, mechanisms for delivering the enhancements directly to the television sets and coordinating the delivered elements with the linear programming, regardless of the delivery path, are desirable.

SUMMARY OF THE INVENTION

An aspect of the present invention provides an enhanced television system and method including a television display in communication with a broadcast enhancement pathway via a first communication interface of the television display and with a video connection via a second communication interface of the television display. The television display receives and displays uncompressed video data from a digital video stream carried over the video connection from a video source and enhancement data from the broadcast enhancement pathway. The digital video stream includes embedded base programming identification metadata. The television display receives the enhancement data from the broadcast enhancement pathway without the enhancement data necessarily passing through the video provider; and extracts a base identification tag from the embedded base programming identification metadata. The enhancement data received from the broadcast enhancement pathway associated with the base identification tag is combined with the digital video stream. The enhancement data includes instructions for receiving additional enhancement information.

In one aspect of the invention, the enhancement data comprises instructions for receiving additional enhancement information.

In another aspect of the invention, the video source is Internet Protocol based.

In one aspect of the invention, the enhancement data is accessed using Internet Protocol.

In another aspect of the invention, the enhancement data comprises instructions directing combination of the digital video stream with enhancements previously placed in an electronic storage associated with the receiver.

In another aspect of the invention, the embedded base programming identification metadata further comprises one or more Internet Protocol address.

In one aspect of the invention, a signature is extracted from the embedded base programming identification metadata, the signature allowing identification of one or more enhancements to be associated with the digital video stream.

In another aspect of the invention, the broadcast enhancement pathway is the digital video stream.

In one aspect of the invention, the first communication interface of the enhanced television system and method is a television reception tuner.

In one aspect of the invention, the base programming identification metadata is embedded in the video stream using steganographic means.

In another aspect of the invention, the base programming identification metadata is embedded in the video stream using watermarking means.

In one aspect of the invention, associated enhancement data received from the reception tuner is processed for enhancement information, and one or more appropriate enhancement is rendered on a display associated with the television receiver.

In one aspect of the invention, the video stream is MPEG-2 TS, and is broadcast using 8-VSB.

In another aspect of the invention, the enhancement data is first inserted into an ATSC robust mode stream, which is broadcast using robust modes of the ATSC transmission system.

In one aspect of the invention, the associated enhancement data received from the broadcast enhancement pathway is processed for enhancement information, and one or more appropriate enhancements is rendered on the television display.

In another aspect of the invention, the enhancement data includes instructions. These instructions may, in various embodiments of the invention, provide for retuning the broadcast reception tuner to an appropriate frequency for receiving additional enhancement data to be combined with the video stream, directing combination of the video stream with enhancements previously placed in an electronic storage associated with the receiver, accepting user input to an input device associated with the receiver, or allowing a user to associate a channel displaying the video stream with another source of enhancement data.

In another aspect of the invention, the base identification tag from the embedded base programming identification metadata is encoded as an audio watermark.

In another aspect of the invention, the embedded base programming identification metadata further includes one or more of the program time codes, enhancement identifiers, or one or more Internet address.

In one aspect of the invention, the enhanced television system and method provides for extraction of a signature from the underlying video, the signature allowing identification of one or more enhancements to be associated with the video stream.

In another aspect of the invention, the video source is a set-top box (STB).

In various aspects of the invention, the video connection is component, HDMI or the like.

In one aspect of the invention, the broadcast enhancement pathway is Internet Protocol based.

In another aspect of the invention, the broadcast enhancement pathway is a cellular data path.

In one aspect of the invention, the video source is Internet based.

In another aspect of the invention, the enhancement data is accessed over the Internet.

In one aspect of the invention, the enhancement data comprises instructions directing combination of the digital video stream with enhancements previously placed in an electronic storage associated with the receiver.

In another aspect of the invention, the embedded base programming identification metadata further comprises program time codes.

In one aspect of the invention, the embedded base programming identification metadata further comprises latency adjustment information extracted by the television display and used to time-shift use of the enhancement information.

In another aspect of the invention, the embedded base programming identification metadata further comprises one or more Internet Protocol address.

In one aspect of the invention, a signature is extracted from the embedded base programming identification metadata which allows identification of one or more enhancements to be associated with the digital video stream.

In another aspect of the invention, the broadcast enhancement pathway is the digital video stream.

In one aspect of the invention, the first communication interface and the second communication interface are the same.

In another aspect of the invention, Signature codes are sent in the Enhancement Pathway and pre-positioned in an electronic storage associated with the television display, and compared with the Signatures extracted from the Base Programming.

BRIEF DESCRIPTION OF THE DRAWINGS

FIG. 5 is a flowchart illustrating a typical path taken by a base programming video stream, in accordance with an embodiment of the present invention; and FIG. 6 is a flowchart illustrating a typical path taken by enhancement data, in accordance with an embodiment of the present invention.

DETAILED DESCRIPTION

Figure 1:
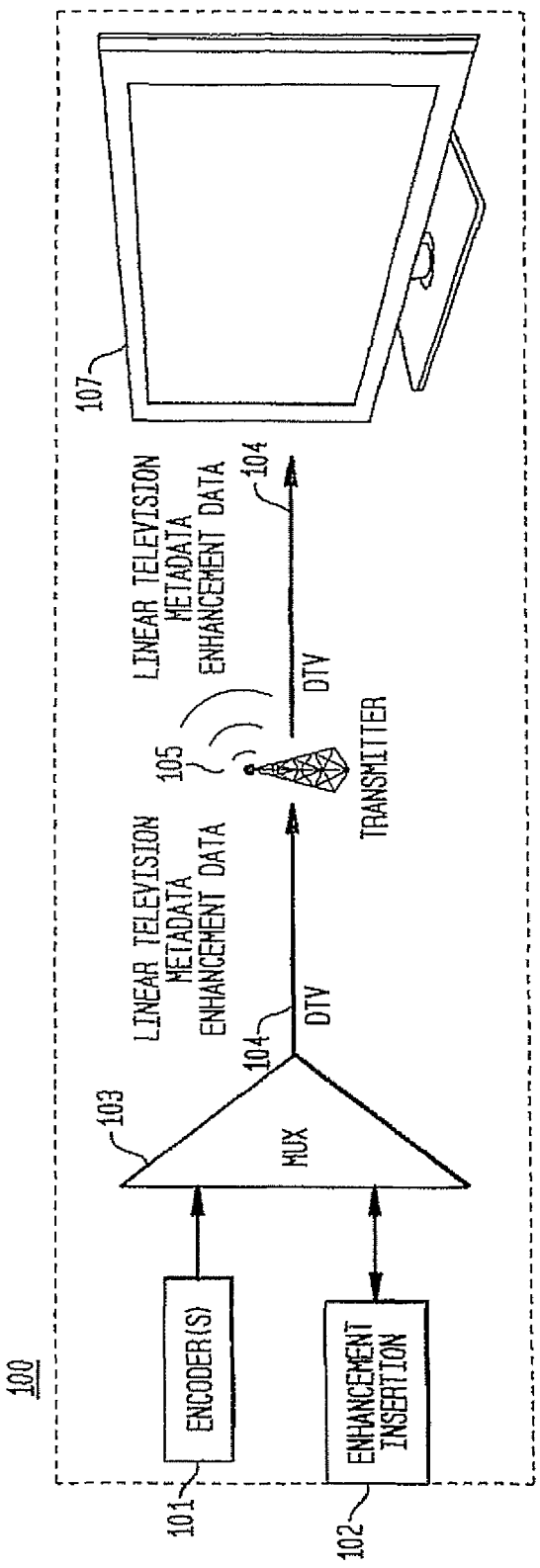
FIG. 1 is a schematic diagram illustrating an exemplary prior art direct terrestrial broadcast path.

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified so as not to obscure the present invention. Furthermore, reference in the specification to "one embodiment" or "an embodiment" means that a particular feature, structure or characteristic described in connection with the embodiment is included in at least one embodiment of the invention. The appearances of the phrase "in an embodiment" in various places in the specification are not necessarily all referring to the same embodiment.

The term "video data" referred to in the descriptions of various embodiments of the invention herein described is intended to generally describe electronic audio and video signals containing or incorporating video for display on a television or other video display device. This term is used in the broadest sense as known in the electronic arts, and may include analog and/or digital signals. Likewise, the term "video stream" is used in a non-limiting fashion and generally refers to the collection of video data, together with any carrier signals, data headers or other electronic information, which singularly or taken together allow the described embodiments to operate. For example, a digital video stream from a given video source might include multiple packets of compressed video data, each packet or group thereof having one or more packet headers. Typically, one or more of the headers includes information relating to the video data, such as the compression algorithm used, the aspect ratio, etc.

Enhanced television content can consist of any of a number of components, such as traditional linear television (video and audio streams), metadata and data objects, without limitation—which need to be delivered to the television or set top box for processing and display. For example, all of these components can be included as elements in the ATSC transport that is carried across the broadcast path as illustrated in FIG. 1.

The term "steganography" referred to in the descriptions of various embodiments of the invention herein described is intended to generally describe the use of digital steganographic techniques, including but not limited to http://en.wikipedia.org/wiki/File:StenographyOriginal.png concealing messages within the lowest bits of noisy images or sound files, concealing data within encrypted data or within random data, chaffing and winnowing, mimicking, concealing messages in tampered executable files, e.g., by exploiting redundancy in the i386 instruction set, embedding pictures in video material (optionally played at slower or faster speed), injecting imperceptible delays in packet delivery, the delays used to encode data, as well as other steganographic techniques as known in the art, without limitation. The steganographic techniques as herein envisioned are designed to survive compression and other standard data manipulations and processes.

The term "watermarking" referred to in the descriptions of various embodiments of the invention herein described is intended to generally describe the use of digital watermarking techniques. Digital watermarking is the process of possibly irreversibly embedding information into a digital signal. The signal may be audio, pictures or video, for example. If the signal is copied, then the information is also carried in the copy. In visible watermarking, the information is visible in the picture or video. In invisible watermarking, information is added as digital data to audio, picture or video, but it cannot be perceived as such, although it is possible to detect the hidden information. Steganography is sometimes employed in digital watermarking, where a secret message is embedded in the digital signal. While some file formats for digital media can contain additional information called metadata, digital watermarking is distinct in that the data is carried in the signal itself. The watermarking techniques as herein envisioned are designed to survive compression and other standard data manipulations and processes.

FIG. 1 represents an exemplary prior art direct broadcast path, in which the broadcaster encodes the audio/video content using an encoder 101, and inserts enhancements 102 via MUX 103 to produce a video stream 104, which is then broadcast via transmitter 105 directly to the television 107. In such a configuration, all components reach the television set directly and enhanced television services and applications can be implemented. It is envisioned that various video stream types may alternatively by employed. For example, MPEG-2 using 8-VSB may be employed, or ATSC-3 using MPEG-H HEVC/H.265 codec may be used instead, with OFDM instead of 8-VSB. Any references to MPEG-2 herein are understood to apply similarly to other video encodings and/or transport mechanisms where appropriate, as well, without limitation.

Figure 2:
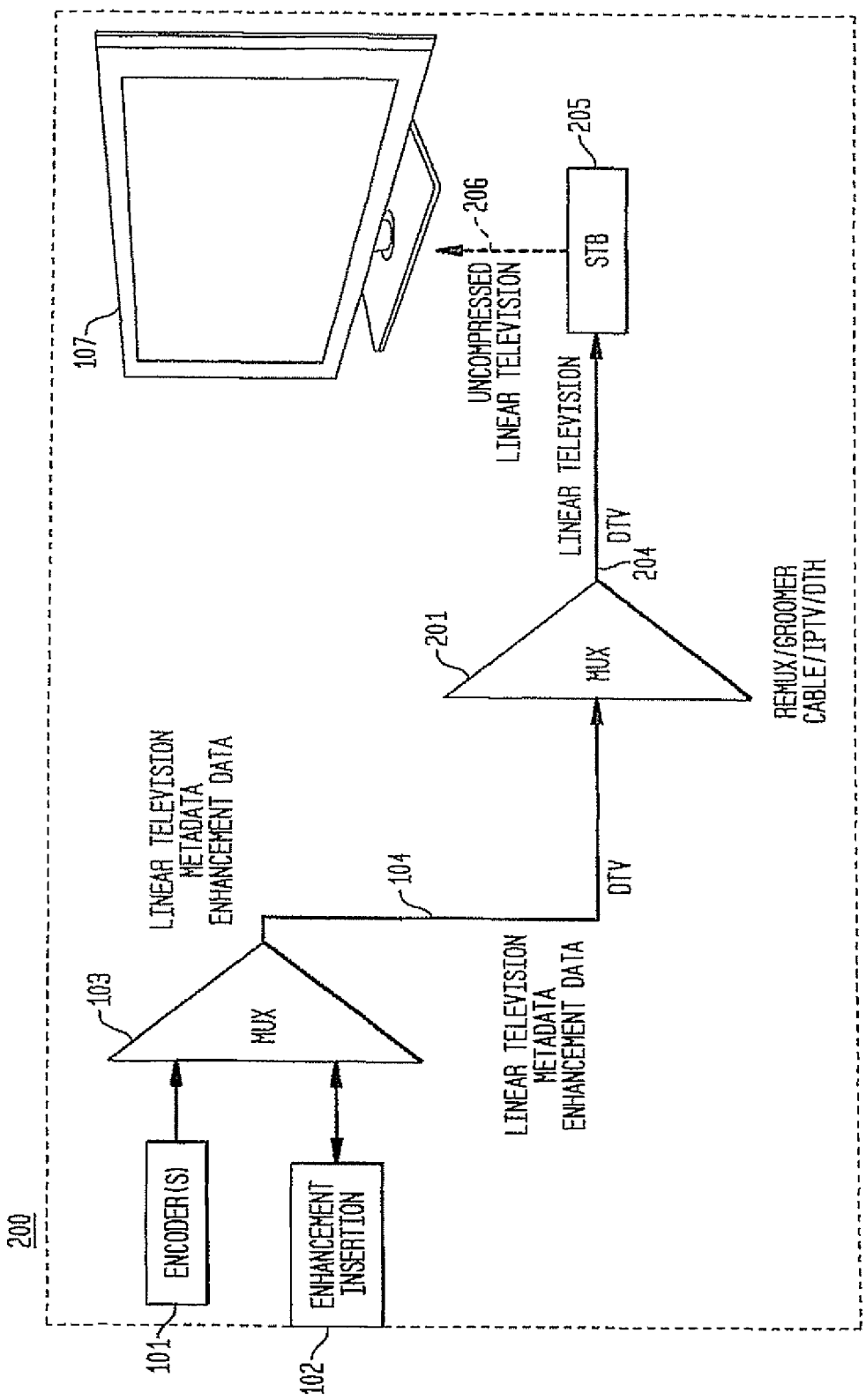
FIG. 2 is a schematic diagram illustrating an exemplary prior art MVPD broadcast path.

In the US, approximately 85% of television viewers do not receive broadcast television through an antenna; instead they receive their signals from an MVPD operator (Cable, Telco (IPTV) or Satellite (DTH)). As illustrated in FIG. 2, these operators typically manipulate the broadcast signal 104 and remove components other than their linear television (video and audio streams), and possibly perform other processing such as rate shaping. Typically, the components for enhanced television are dropped from the stream at the MVPD remux/groomer 201 and are not present in the video stream 204 reaching the home. At the home, a set-top box (STB) 205 typically receives the video stream 204, performs the tuning and decoding of the signal, and outputs uncompressed video and audio using a composite, component, DVI, HDMI or other connection 206, but not the dropped components for enhanced television. If enhancement data is present in the stream provided by the MVPD, it will not pass through the STB into the television. Because the television enhancements benefit the terrestrial broadcaster and not necessarily the MVPD operator, there is little incentive for the MVPD operator to provide a STB able to implement the functionality to decode/render the enhancements.

The present invention advantageously provides a means to communicate the enhancement data directly to a television set in an environment where an MVPD is providing the viewed content via an STB to the viewer's television, and to properly associate it with related underlying programming, or "Base Programming," when appropriate.

Figure 3:
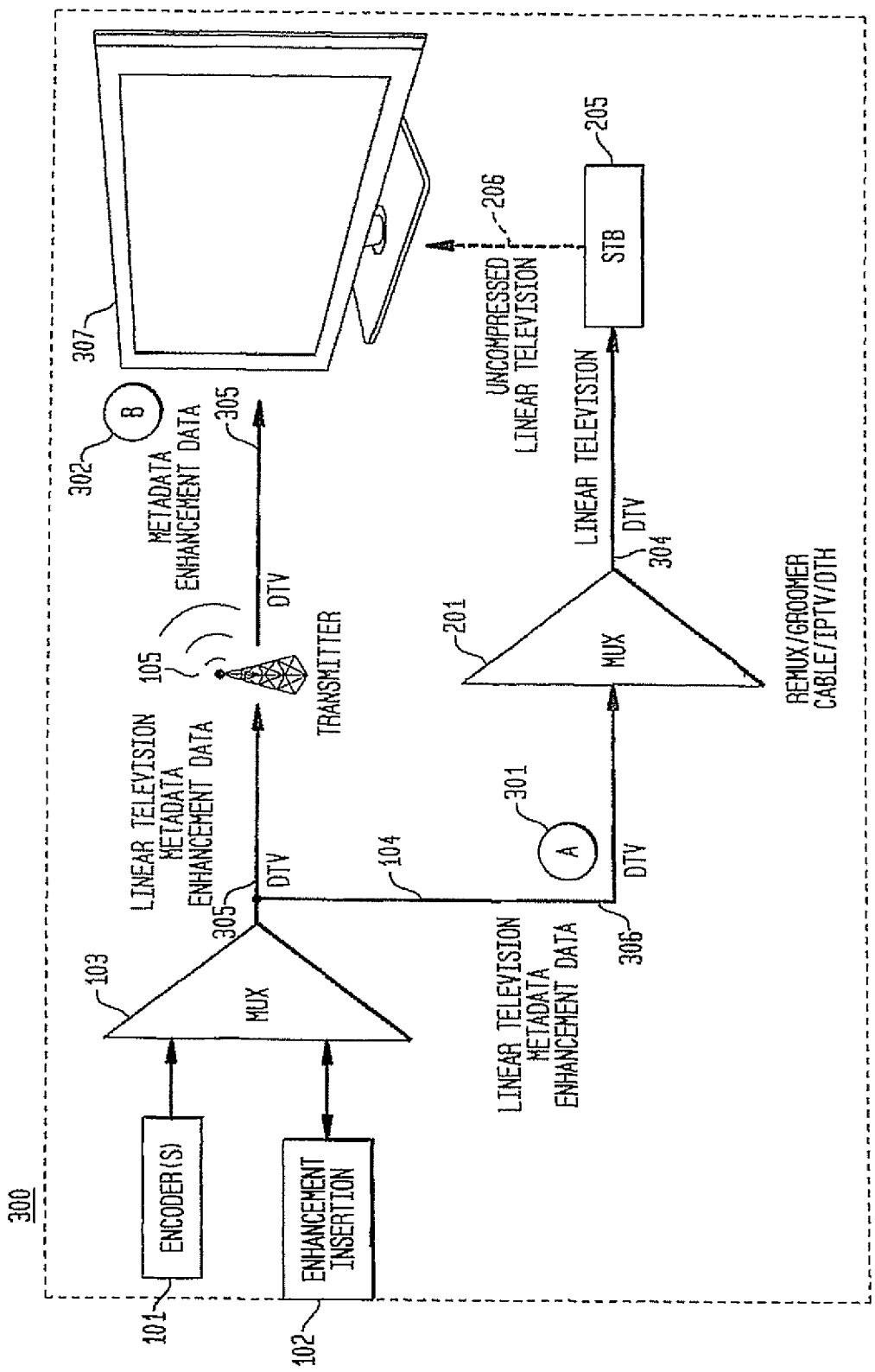
FIG. 3 is a schematic diagram illustrating exemplary broadcast paths for enhancement data, in accordance with an embodiment of the present invention.

FIG. 3 illustrates a broadcast path in an exemplary embodiment of the invention. Linear television content (Base Programming) will follow path "A" 301 in FIG. 3, passing through the MVPD operator's plant 201, where the enhancement data will typically be stripped off. The Base Programming video stream 304 then is received by the STB 205 where it is decoded and sent via an uncompressed connection 206 to the television 307.

FIG. 5 is a flowchart 500 depicting an exemplary path "A" taken by the Base Programming video stream 304. In a typical system, an uncompressed A/V stream 501 is checked for embedded metadata by an extractor 505. If metadata is found, such as by identifying an embedded base ID 510, the TV tuner is checked to ensure it is tuned to the correct channel 515, and, if not, tuned to the correct channel 520. Next, a combiner checks for 525 and renders 530 any matching enhancement content.

Path "B" 302 in FIG. 3, "the Enhancement Path", operates in parallel, delivering just the enhancement metadata and data 305 through a robust means. In one embodiment, path "B" uses robust modes of the ATSC transmission system to deliver the enhancements directly to a receiver tuner in the television itself (not depicted). The use of this technology allows a small, embedded antenna to be built within the television itself—meaning that no setup or external connections would be required to receive signals over this path.

FIG. 6 is a flowchart 600 illustrating a typical Enhancement Path taken by enhancement data in accordance with an embodiment of the present invention. Enhancement data is broadcast 601 and received by the transmission system, where it is then processed 605. If enhancement metadata is found 610, it is then stored 615, including any metadata as well as enhancement data.

An additional element, if present in the system, enables "bound applications," or applications that extend the Base Programming of a specific channel. "Unbound applications" are those that stand alone and do not rely on any underlying video content delivered through the MVPD.

Figure 4:
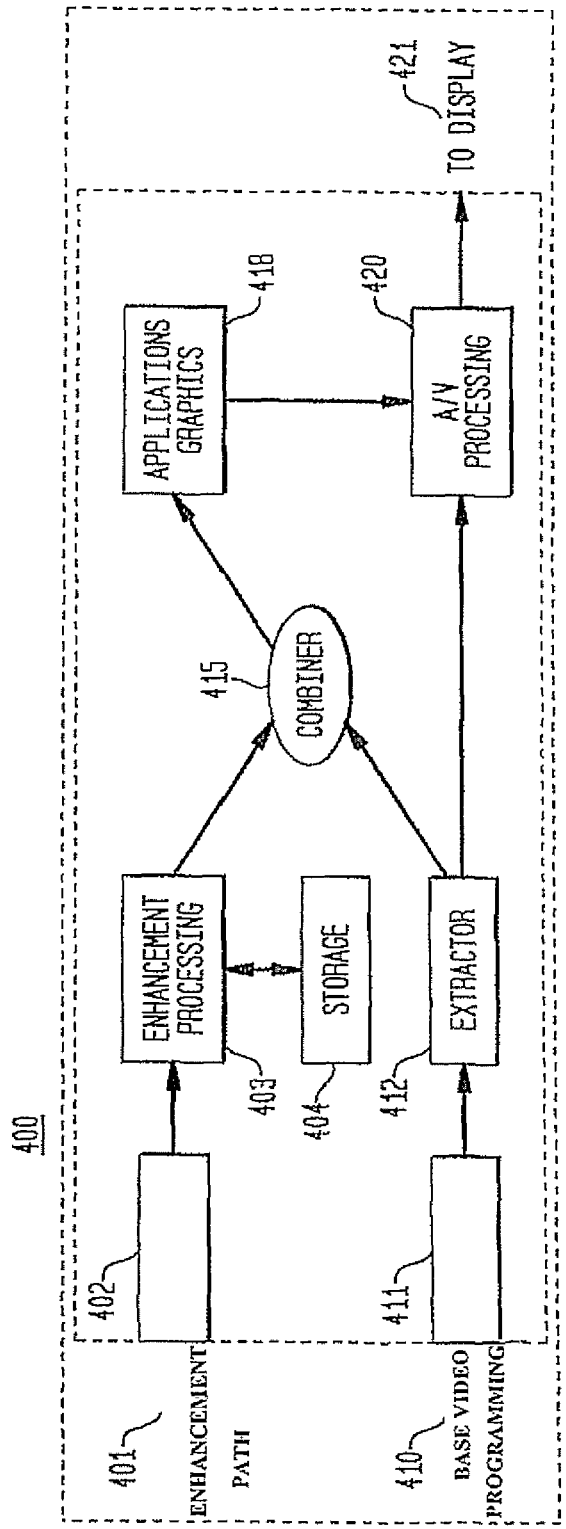
FIG. 4 is a schematic diagram illustrating operation of an exemplary television receiver for receiving and combining a video stream and enhancement data, in accordance with an embodiment of the present invention.

An example of an application is illustrated in FIG. 4. Here, a combiner 415 provides the ability to associate the channel from the MVPD currently being viewed with the correct set of enhancement information. A small amount of metadata, e.g., the equivalent of "I'm channel X", is embedded in the Base Programming in a way that will survive encoding and decoding and other video processing in the MVPD. Steganography or watermarking are suitable for survivably embedding this metadata. This information is extracted by the television and used by the combiner 415 to match enhancements delivered over the Enhancement Path with the Base Programming being watched.

In an embodiment of the invention, Base Programming Identification Metadata, including Base ID, is embedded in the video via steganographic means at the broadcast station. The station's main stream. TSID, as defined in the ATSC standards, is a unique element that can be used for Base ID. Additionally, the minor channel number can also be included to reflect the individual service. The Base ID is repeated within the Linear Programming Metadata frequently, for example, approximately every second, for later decoding.

Also at the broadcast station, the audio and video are encoded and multiplexed into an ATSC transport format or the like—this comprises the Base Programming. The Base Programming ATSC transport format may be broadcast using ATSC 1.0 or ATSC 3.0. In addition, the Base Programming ATSC transport format may be delivered to the MVPD as usual, which may be over the broadcast path, or alternatively sent directly to the MVPD over a direct link. Thus, in summary, the current delivery methods to the MVPD for the broadcast station's Base Programming are unchanged. The enhancement metadata and data are inserted into an ATSC robust stream, including Enhancement Base ID for comparison in the Combiner. The ATSC robust stream is broadcast using robust modes of the ATSC transmission system.

At the viewer's home, the ATSC tuner is receiving and processing enhancement data and metadata—reassembling, storing and/or rendering as appropriate for the application, preserving the Base ID tag to allow association with Base Programming through the Combiner. Simultaneously, the television set examines the video/audio feed from the STB, looks for embedded metadata including Base ID, and when found, it is extracted and passed to the Combiner. When the Combiner receives a Base ID, it finds associated enhancement information. The process for doing this may involve retuning the Mobile Tuner to the appropriate frequency associated with the Base ID, or appropriate enhancements may be found in storage or located on the internet. The associated enhancements are then rendered as appropriate for the specific data and application, including rendering graphical overlays on top of the underlying Base Programming, possibly in response to user interaction.

In an embodiment of the invention, the Base ID can be encoded in the Base Programming using alternative methods.

One alternate method of encoding is by audio watermarking, in which standard techniques for encoding low bit rate information in audio stream, which are robust to compression/decompression and other manipulations of the MVPD may be employed.

Another alternative method of encoding is by Visual indicators, in which the Base Programming itself may direct the viewer to associate the current channel with a specific source of enhancement data stored or receivable by the enhanced television set. For example, a graphic may indicate a Base Programming code with text such as "please direct your enhanced TV to Channel 12's enhancements when watching this channel. Enter 12.1 into the TV's Enhancement Locator." In this case the viewer might use the remote control to input into the enhanced television set the Base Programming code through a menu system or other input interface on the enhanced television.

Another alternative method of encoding is by Audio indicators, in which the Base Programming may contain a verbal indicator of the source, such as "please direct your enhanced TV to Channel 12's enhancements when watching this channel. Enter 12.1 into the Enhancement Locator." Again the viewer might then use the remote control to input into the advanced television set the enhancement location information.

In another embodiment of the invention, other automated encoding means may be employed. For example, while the phrase "video watermarking" may be defined in different ways, it is used herein to make it clear that it includes any of a variety of video-based encoding mechanisms that enable an automated detection of low bit rate Base Programming Metadata, based on video characteristics that survive compression/decompression, rate shaping, and other video processing manipulations of the MVPD. For example, sub-perceptual or perceptual flashes, geometric shapes, color gamut patterns, etc.

Similarly, any variety of automated encoding and detection techniques for low bit rate data within an audio stream, based on audio characteristics, could be employed, which we would include under the phrase "audio watermarking."

Other encoding techniques, allowing low bit rate data to be encoded in a linear video/audio stream, including encoding that relies on both video and audio elements, and their potential interrelationship are also envisioned.

In an embodiment of the invention, Base Programming Metadata may include other metadata elements besides Base ID. Examples of these elements include Program Time Codes and enhancement synchronization, Enhancement identifiers, and URL's or other resource locators.

With respect to Program time codes, certain "bound applications" are time dependent in the sense that they are relevant only during certain time ranges with the associated linear program. For example, during a baseball game, the statistics associated with the current batter could be optionally displayed via remote control. Extended product information could be available only during the commercial for that product. News stories could be enhanced with additional textual information that could be optionally displayed under control of the user during that story. The encoding methods disclosed could encode relative or absolute time codes within the Base Programming, so that enhancements sent over the Enhancement Path can be not only associated with the Base Programming source, but also with the correct time within that source.

With respect to Enhancement identifiers, some enhancements may be reused multiple times, e.g., additional product information for a given product would be the appropriate enhancement whenever associated commercials are broadcast in the Base Programming. To conserve bandwidth, or ensure the full enhancement data is available, such enhancement could be delivered in advance and rendered when appropriate, potentially multiple times over. An Enhancement ID and launch "cue tone" may be used to signal what Enhancement to render at what time.

With respect to URLs or other resource locators, in the case where the enhanced TV has access to the Internet, or other information source, the Linear Programming Identification metadata could include a URL or other resource location mechanism, that would enable the enhanced TV to find or retrieve enhancements to associate with the underlying Base Programming.

In various embodiments of the present invention, alternative paths for Enhancement Data are envisioned. While the preferred embodiment may be to deliver Enhancement Data over the robust reception path afforded by the ATSC standard, alternative delivery mechanisms might be used.

For example, delivery via an Internet Protocol based mechanism may be employed. Enhancements could be delivered, either pushed to the Enhanced TV or pulled by the Enhanced TV, over the internet, and re-associated with the underlying Base Programming as described. In one embodiment, both the video stream and the enhancements are accessed over the Internet.

Cellular data paths or other wireless delivery paths, such as WiMax may be employed.

Also, in an embodiment of the invention, the Base Programming may itself encode certain enhancements, within the data rate of the Enhancement Metadata encoding technology. This enables Enhanced television, even in the case where no alternative data path to the TV is available. Some attractive applications can thus be deployed in absolutely any area, which may be an important consideration in planning for Enhanced television product launch strategy.

An embodiment of the invention uses Base Programming Signatures. Video/audio processing techniques can extract "Signatures" from the Base Programming, even if no data/metadata has been explicitly encoded. These Signatures allow accurate and unique identification of the Base Programming based on video and/or audio characteristics. For example, a specific television commercial could be reliably detected in the Base Programming, whether a broadcast station or any other program source delivered it.

Such Signatures can be used to match the Base Programming with associated enhancements, through an extended Combiner process. That is, no explicit coding need be inserted in the base programming, Signatures can be extracted, and matched with Signature codes sent in the Enhancement Path and pre-positioned in the TV for later use.

The use of Signatures would enable enhancements to be delivered and associated with Base Programming that is not part of the affiliated broadcast network. For example, a "Coke" campaign commercial could run repeatedly on a wide range of TV channels for a certain period, even on non-broadcast cable channels. Such commercials could be detected through signatures whenever being viewed, and could be Combined with associated enhancements previously sent and stored in the enhanced TV through an Enhancement Path. Similarly, Signature detection and matching through the Combiner enables enhancement of cable programming. For example, ESPN could deliver interactive enhancements of sporting events, which can be rendered while the viewer is watching the associated ESPN program, without any cooperation of the MVPD required.

Latency adjustment may also be employed in an embodiment of the invention. Different distribution systems have different latencies, depending upon the number and type of encoding/processing steps involved. This means that the arrival time of the Base Programming and the Base ID can be displaced in time relative to the original broadcast, due to processing by the MVPD, while the enhancement channel does not undergo the same amount of latency. Mechanisms to automatically calibrate/adjust for this latency can be incorporated, including periodically placing simultaneous known signals into the Base ID and Enhancement channel and adjusting for latency depending upon their arrival time. These mechanisms may also incorporate difference in latency between distribution paths and adjust accordingly.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An enhanced television system comprising:
a television display including a first communication interface for receiving enhancement data;
the television display receiving and displaying uncompressed video data received from a video source connected to a second communication interface of the television display, wherein the video data comprises embedded base programming identification metadata that is steganographically embedded into and not identifiable and removable from the video data in the portion of the video data intended to be presented to the viewer;
the television display further extracting a base identification tag from the embedded base programming identification metadata, and selecting the enhancement data associated with the base identification tag; and
the television display rendering the enhancement data and combining the enhancement data with the video data.

2. The enhanced television system according to claim 1, wherein the enhancement data comprises instructions for receiving additional enhancement information.

3. The enhanced television system according to claim 1, wherein the first communication interface is a television reception tuner.

4. The enhanced television system according to claim 1, wherein the first communication interface is configured to receive Internet Protocol based data.

5. The enhanced television system according to claim 1, wherein the first communication interface is configured to receive cellular-based data.

6. The enhanced television system according to claim 1, wherein the video source is Internet Protocol based.

7. The enhanced television system according to claim 1, wherein the received enhancement data comprises data indicative of a location where enhancement data may be accessed using Internet Protocol.

8. The enhancement television system according to claim 1, wherein the embedded base programming identification metadata further comprises latency adjustment information, the latency adjustment information being extracted by the television display and used to time-shift use of the enhancement information.

9. The enhanced television system according to claim 1, wherein the first communication interface and the second communication interface comprise the same communication interface.

10. A television enhancement method comprising:
receiving enhancement data from a first communication interface of a television display;
receiving and displaying uncompressed video data received from a video source connected to a second communication interface of a television display, wherein the video data comprises embedded base programming identification metadata that is steganographically embedded into and not identifiable and removable from the video data in the portion of the video data intended to be presented to the viewer;
extracting a base identification tag from the embedded base programming identification metadata by the television display;
selecting the enhancement data associated with the base identification tag; and
rendering the enhancement data and combining the enhancement data with the video data by the television display.

11. The television enhancement method according to claim 10, wherein the enhancement data comprises instructions for receiving additional enhancement information.

12. The television enhancement method according to claim 10, wherein the video source is Internet protocol based.

13. The television enhancement method according to claim 10, wherein the first communication interface and the second communication interface are the same.

14. The television enhancement method according to claim 10, wherein the second communication interface is a reception tuner.

15. The television enhancement method according to claim 10, wherein the video data is received from an MPEG-2 TS digital video stream.

16. The television enhancement method according to claim 10, wherein the enhancement data is first inserted into an ATSC robust stream.

17. The television enhancement method according to claim 16, wherein the ATSC robust stream is broadcast using the ATSC A/153 Mobile broadcast standard.

18. The television enhancement method according to claim 10, wherein the embedded base programming identification metadata further comprises program time codes.

19. The television enhancement method according to claim 10, wherein the embedded base programming identification metadata further comprises enhancement identifiers.

20. The television enhancement method according to claim 10, wherein Signature codes are sent in the enhancement data and pre-positioned in an electronic storage associated with the television display, and compared with the Signatures extracted from the embedded base programming identification metadata.

21. An enhanced television system comprising:
a television display having an interface connected to a video source for receiving and displaying uncompressed video data, wherein the video data comprises embedded base programming identification metadata that is steganographically embedded into and not identifiable and removable from the video data in the portion of the video data intended to be presented to the viewer;
the television display further extracting a base identification tag from the embedded base programming identification metadata,
the television display including an integrated digital antenna and digital tuner for receiving an ATSC robust stream that is broadcast using an ATSC broadcast standard, wherein the ATSC robust stream includes enhancement data;
the television display further using the identification tag to select specific enhancement data that was stored in an integrated memory device; and
the television display further processing the specific enhancement data as a graphical overlay and displaying the specific enhancement data with the video data.

* * * * *